United States Patent [19]

Enomoto

[11] 4,409,620
[45] Oct. 11, 1983

[54] PICTURE DIVISION TYPE AUTOMATIC EXPOSURE CONTROL DEVICE FOR TELEVISION CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 284,745

[22] Filed: Jul. 20, 1981

[30] Foreign Application Priority Data

Aug. 26, 1980 [JP] Japan .................... 55-117348

[51] Int. Cl.³ .............................................. H04N 5/38
[52] U.S. Cl. ...................................................... 358/228
[58] Field of Search ........................................ 358/228

[56] References Cited

U.S. PATENT DOCUMENTS

| | | | |
|---|---|---|---|
| 3,495,037 | 2/1970 | Hitz | 358/228 |
| 3,555,181 | 1/1971 | Thommen | 358/228 |
| 3,576,393 | 4/1971 | Thompson | 358/228 |
| 4,318,132 | 3/1982 | Machida | 358/228 |

FOREIGN PATENT DOCUMENTS 2550773  5/1976  Fed. Rep. of Germany ...... 358/228

Primary Examiner—Michael A. Masinick
Attorney, Agent, or Firm—Sughrue, Mion, Zinn, Macpeak, and Seas

[57] ABSTRACT

An automatic exposure control circuit for a television camera which, irrespective of the illumination intensity of an object being photographed, provides a suitable exposure value at all times. The circuit includes a video signal extracting circuit for dividing a video signal for a field into a plurality of parts in a time division mode to selectively extract a specified picture region and a circuit for performing automatic exposure control in response to the selected video signal. The automatic exposure may be performed by a diaphragm control circuit including a rectifying circuit which operates upon the video signal corresponding to the extracted picture region and a circuit for maintaining the level of the video signal constant.

12 Claims, 6 Drawing Figures

PICTURE DIVISION TYPE AUTOMATIC EXPOSURE CONTROL DEVICE FOR TELEVISION CAMERA

BACKGROUND OF THE INVENTION

In using a conventional automatic exposure control type television camera indoors, if for instance, the illuminating light on the ceiling appears directly in the picture or there is a bright window behind a main object to be photographed, the automatic exposure control circuit's operation is adversely affected by these bright objects such that a correct or suitable exposure value cannot be obtained for the main object. This is because the composite video signal for the entire scene is used to perform exposure control. Especially in a television camera intended for home use, the illuminating light is often insufficient and accordingly the signal of the main object is liable to be execessively underexposed. Even in using such a camera outdoors, the same phenomenon can occur, for example, if a main object is in the shadow of a tree with a bright sky as the background in the picture.

In order to eliminate the difficulties due to the above-described phenomena, cameras having a back-light correcting circuit or a manual exposure switching circuit have been proposed in the art. In the back-light correcting circuit, an exposure value is set one or two steps higher than the value at which it would be set without correction by operation of a correcting switch or the like. However, it is not always possible for the back-light correcting circuit to provide a suitable exposure value for an object to be photographed. Theoretically, a correct exposure can be provided for a main object to be photographed by switching from automatic exposure control to manual exposure control. However, this increases the number of steps required for the exposure control making that method rather troublesome.

In view of the foregoing, it is an object of the invention to provide a television camera which can, irrespective of the illumination of an object being photographed, readily provide a suitable exposure value substantially at all times.

SUMMARY OF THE INVENTION

Achieving these and other objects, in accordance with the invention, a picture is divided into a plurality of parts or picture regions, a desired one of the plural picture regions is specified by the cameraman, and a video signal corresponding only to the picture region thus specified is utilized to perform automatic exposure control.

DESCRIPTION OF THE PREFERRED EMBODIMENTS

Preferred embodiments of the invention will be described with reference to the accompanying drawings.

Figure 2:
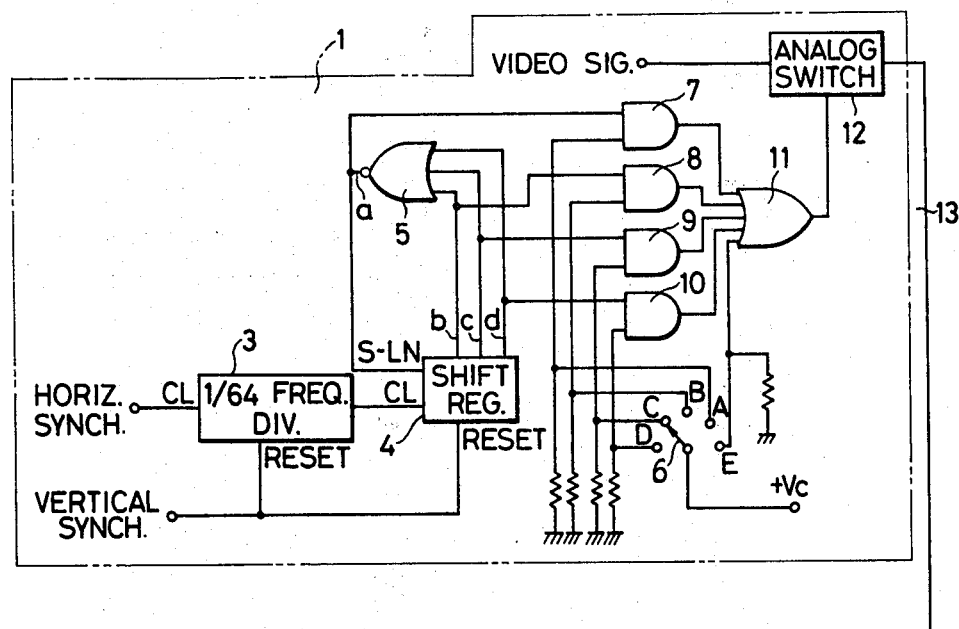
FIG. 2 is a circuit diagram of a preferred embodiment of an automatic exposure device according to the invention employing an automatic aperture control type automatic exposure system.
Figure 2:
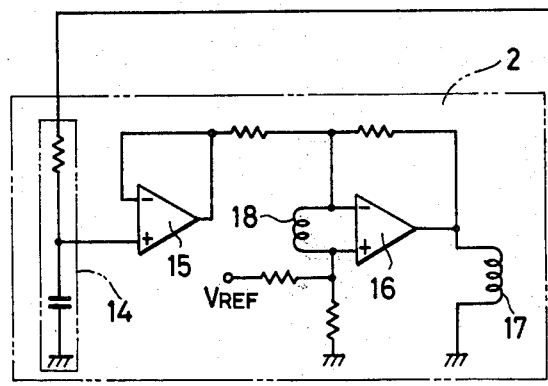

FIG. 2 is a circuit diagram of a preferred embodiment of an automatic exposure device according to the invention, which is available in an NTSC type television camera having 525 scanning lines. In FIG. 2, reference numerals 1 and 2 designate a video signal extracting circuit and a diaphragm control circuit, respectively. In the video signal extracting circuit 1, the frequency of a horizontal synchronizing signal is divided by four and a video signal corresponding to one field is divided into four parts in a time division mode thereby to selectively extract a specified picture region. The diaphragm control circuit 2 operates to control a diaphragm device so that the level of a voltage obtained by filtering the video signal which is extracted by the video signal extracting circuit 1 is constant irrespective of the luminance of an object or scene photographed. An automatic exposure device of the invention includes an essential components the above-described video signal extracting circuit 1 and diaphragm control circuit 2. The arrangements and operation of the circuits 1 and 2 will be described in detail.

Figure 1:
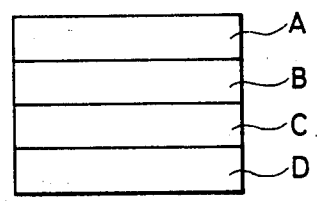
FIG. 1 is an explanatory diagram showing a video picture divided into four parts by a video signal extracting circuit of the invention.

In the video signal extracting circuit 1, the horizontal synchronizing signal is subjected to 1/64 frequency division by a frequency divider circuit 3, the output of which is applied to the clock terminal CL of a shift register 4. Instead of the above-described circuit in which the horizontal synchronizing signal is subjected to frequency division, the corresponding frequency signal may be applied to the clock terminal CL of the shift register 4. The output a of a NOR gate 5 and the outputs b, c and d of the shift register 4 correspond to the picture regions A, B, C and D, respectively, shown in FIG. 1. For instance, when the region C in FIG. 1 is scanned, only the output c of the shift register 4 is raised to a high logic level.

A selector switch 6, which may be a rotary switch, specifies one of the picture regions A, B, C and D. If, for instance, the picture region C is selected by the selector switch 6, an analog switch 12 is rendered conductive only for the period of time during which the picture region C is scanned using AND gates 7, 8, 9 and 10 and an OR gate 11, as a result of which only the part corresponding to the video signal applied to the input of the analog switch 12 corresponding to the picture region C is extracted and applied to the output terminal 13 of the video signal extracting circuit 1. When the armature of the selector switch 6 is set to the terminal E, the video signal for the entire field of a picture is applied to the output terminal 13.

The diaphragm control circuit 2 is composed of a filter circuit 14 including a resistor and a capacitor for converting the output of the video signal extracting circuit 1 into a DC signal by filtering the output of the circuit 1, a buffer circuit 15, and a comparison amplifier 16 coupled to the output of the filter circuit 14. In the comparison amplifier 16, the output of the buffer circuit 15 is compared with an exposure reference voltage $V_{REF}$. The output of the comparison amplifier 16 is applied to an automatic diaphragm driving coil 17 to obtain a suitable aperture value. In FIG. 2, reference numerals 18 designates a brake coil which detects an automatic diaphragm moving speed to obtain a suitable operation speed thereby to stabilize the control operation.

Figure 3:
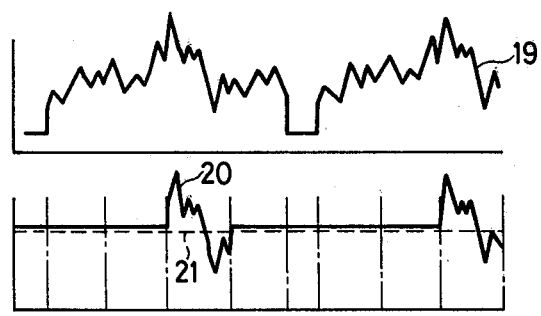
FIG. 3 is a waveform diagram showing the waveforms of a video signal 19 prior to extraction, of a video signal 20 after extraction, and of a signal 21 obtained by filtering the video signal 20.

FIG. 3 shows a waveform 19 of a video signal applied to the analog switch 12, a waveform 20 at the output terminal 13 of the video signal extracting circuit 1, and a waveform 21 of the output of the filter circuit 14. The waveforms shown in FIG. 3 are those of signals which are present when the picture region C is selected.

In the above-described embodiment, the filter circuit 14 is an RC circuit type as shown in FIG. 2. Its output represents an average value of the extracted video signal. However, the filter circuit 14 may be replaced by a different processing circuit, such as a circuit which outputs the peak value of an extracted video signal if desired. The video signal applied to the analog switch 12 must be fixed in black level.

With the automatic exposure device thus constructed, a cameraman can select a video signal corresponding to a desired picture region as follows. While observing the scene through the camera monitor, the cameraman determines which of the picture regions A, B, C and D includes the main object of interest and selects the video signal corresponding to that picture region by use of the selector switch 6. If, an illuminating light on the ceiling or a bright sky appears in the scene, a picture region is selected which does not include such a bright object so that a suitable exposure value is provided at all times. Of course, in the case also where the luminances of the background or objects other than the main objects are much lower than that of the main object, a suitable exposure value can be obtained by suitably selecting one of those picture regions.

Figure 4:
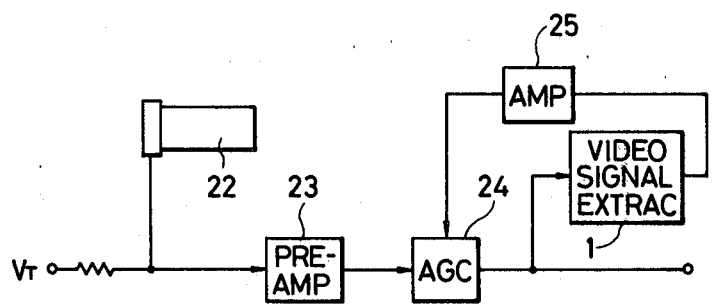
FIG. 4 is a circuit diagram, partly as a block diagram, showing an automatic exposure system according to the invention in which the gain of a video signal controlling circuit (AGC circuit) is controlled.

Television cameras employ a variety of automatic exposure control systems, for example, an aperture value controlling system, a video signal gain control system, and an image pickup tube target voltage controlling system. Some television cameras employ two or more of these systems. An automatic exposure control system in which a picture region is selected to operate a diaphragm has been described. FIG. 4 shows an automatic exposure control system utilizing a video signal gain control circuit (AGC circuit).

Figure 5:
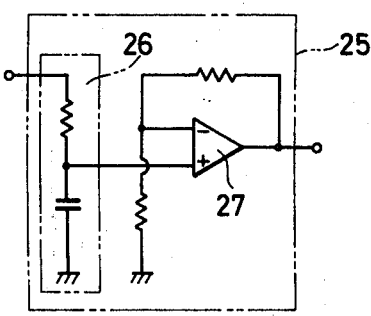
FIG. 5 is a circuit diagram showing an example of a circuit for providing a voltage for controlling the gain of the AGC circuit in FIG. 4.

In the circuit of FIG. 4, the output signal of an image pickup tube 22 is amplified to a desired video signal level by a preamplifier 23 and an AGC circuit 24. The video signal is applied to a video signal extracting circuit 1 of the type described with reference to FIG. 2. The video signal corresponding to an extracted picture region is filtered and suitably amplified by a circuit 25 which provides a voltage used to control the AGC circuit. The video signal thus processed is applied to the AGC circuit 24. The circuit 25, as shown in FIG. 5, is composed of a filter circuit 26 and an amplifier 27 having a suitable amplification factor. The AGC circuit 24 operates such that when the output voltage of the amplifier 27 is high, the gain is decreased. Specifically, the AGC circuit 24 operates to maintain the output of the filter circuit 26 constant.

Figure 6:
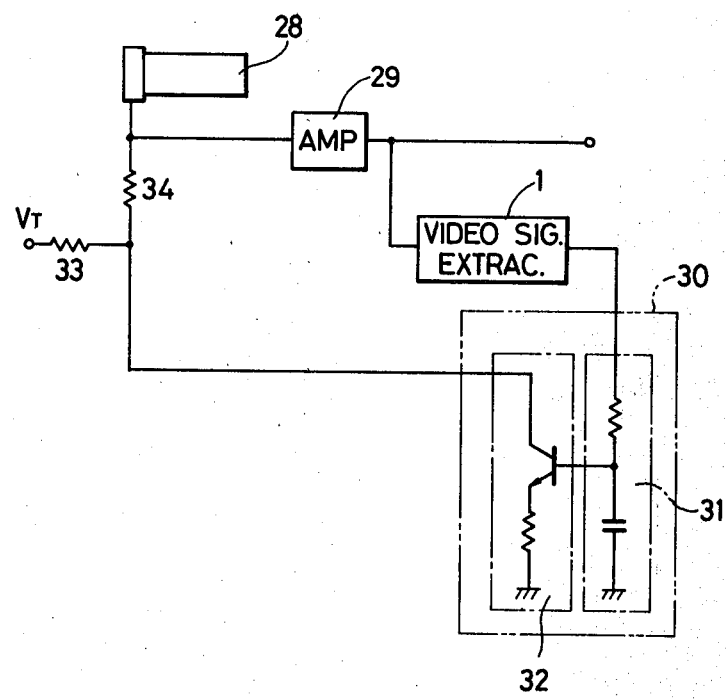
FIG. 6 is a circuit diagram, partly as a block diagram, showing an automatic exposure system according to the invention in which the target voltage of an image pickup tube is controlled.

FIG. 6 shows a system in which the target voltage of an image pickup tube is controlled to control the sensitivity of the image pickup tube thereby to perform automatic exposure control. In FIG. 6, the output signal of an image pickup tube 28 is amplified to a desired video signal level by an amplifier 29. The video signal is applied to the video signal extracting circuit 1 and a video signal corresponding to a selected picture region is applied to a target voltage control circuit 30, indicated by a broken line in FIG. 6. The target voltage control circuit 30 includes a filter circuit 31 which filters a video signal corresponding to an extracted picture region and a conversion circuit 32 for converting the output of the filter circuit 31 into an electrical current. The target voltage control circuit 30 operates as follows. The target voltage of the image pickup tube is supplied through resistors 33 and 34 by a target voltage source $V_T$. Therefore, the target voltage varies with the value of the current flowing in the conversion circuit 32 which varies with the output voltage of the filter circuit 31. Accordingly, by choosing a suitable voltage-to-current conversion characteristic for the conversion circuit 32, the sensitivity of the image pickup tube can be properly controlled and the output voltage of the filter circuit 31 can be maintained constant thus performing automatic exposure control.

Three sytems of performing automatic exposure control by selectively extracting one of the picture regions have been described above. These systems may be selectively employed depending on the type of image pickup tubes used or the intended use of the television camera. For instance, in the case of an aperture-priority automatic exposure television camera, the system may be employed in which the target voltage is adjusted with the aperture control effected manually. If the exposure adjustment range is small, the system of controlling the gain of the video signal gain controlling the gain of the video signal gain controlling circuit (AGC circuit) may be employed.

What is claimed is:

1. An automatic exposure control circuit for a television camera, comprising:
    a video signal extracting circuit means for dividing a video signal for a field into a plurality of parts in a time division mode and for selectively extracting any one of said parts each of which represents a different specified picture region less than the entire field; and
    means for performing automatic exposure control in response to a video signal corresponding only to said picture region extracted by said video signal extracting circuit means.

2. The automatic exposure control circuit as claimed in claim 1 wherein said automatic exposure control performing means comprises:
    a diaphragm control circuit for controlling a diaphragm comprising a processing circuit for processing said video signal corresponding to said selectively extracted specified picture region and circuit means for maintaining the output of said processing circuit constant irrespective of a luminance of an object being photographed.

3. The automatic exposure control circuit as claimed in claim 1 wherein said automatic exposure control performing means comprises:
    means for processing said video signal corresponding to said selectively extracted specified picture region;
    a video gain control circuit for setting a gain of the processed video signal, wherein said processed video signal is maintained substantially constant in level irrespective of a luminance of an object being photographed.

4. The automatic exposure control circuit as claimed in claim 1 wherein said automatic exposure control performing means comprises:
means for processing said video signal corresponding to said selectively extracted specified picture region;
means for controlling an image pickup tube target voltage so that the processed video signal is maintained unchanged in level irrespective of a luminance of an object being photographed.

5. The automatic exposure control circuit as claimed in claim 1 wherein said video signal extracting circuit means comprises: a frequency divider having a clock input coupled to a source of horizontal synchronizing pulses; a shift register having a clock input coupled to an output of said frequency divider; a first OR gate having inputs coupled to corresponding outputs of said shift register and an output coupled to a signal input of said shift register; a plurality of AND gates, first of said AND gates having a first input coupled to said output of said first OR gate and others of said AND gates having first inputs coupled to corresponding outputs of said shift register; a second OR gate having inputs coupled to corresponding outputs of said AND gates; a selector switch having output contacts coupled to corresponding second inputs of said AND gates and an input of said second OR gate; and an analog switch having a signal input coupled to receive said video signal for a field, said analog switch having a switch control input coupled to an output of said second OR gate, said video signal corresponding only to said picture region being provided on an output of said analog switch.

6. The automatic exposure control circuit as claimed in claim 5 wherein said means for performing automatic exposure control comprises: a processing circuit having an input coupled to said output of said analog switch; a buffer amplifier having a non-inverting input coupled to an output of said processing circuit; a comparison amplifier having a first input coupled to an output of said buffer amplifier and a second input coupled to a source of a reference voltage; and a diaphragm driving coil coupled to an output of said comparison amplifier.

7. The automatic exposure control circuit as claimed in claim 6 wherein said filtering circuit comprises: a resistor having a first terminal coupled to said output of said analog switch and a second terminal coupled to said non-inverting input of said buffer amplifier; and a capacitor having a first input coupled to said non-inverting input of said buffer amplifier and a second terminal coupled to ground.

8. The automatic exposure control circuit as claimed in claim 6 further comprising: a brake coil for detecting an automatic diaphragm moving speed coupled between said first and second inputs of said comparison amplifier.

9. An automatic exposure control circuit for a television camera, comprising:
a pre-amplifier having an input coupled to an output of an image pickup tube;
an automatic gain control circuit having a signal input coupled to an output of said pre-amplifier circuit;
a video signal extracting circuit for dividing a video signal for a field into a plurality of parts in a time division mode and for selectively extracting any one of said parts each of which represent a different specified picture region less than the entire field, and having an input coupled to an output of said automatic gain control circuit;
a processing circuit coupled to an output of said video signal extracting circuit; and
a buffer amplifier having an input coupled to an output of said processing circuit and an output coupled to a control input of said automatic gain control circuit.

10. The automatic exposure control circuit as claimed in claim 9 wherein said filtering circuit comprises: a resistor having a first terminal coupled to said output of said video signal extracting circuit and a second terminal coupled to a non-inverting input of said buffer amplifier; and a capacitor having a first terminal coupled to said non-inverting input of said buffer amplifier and a second terminal coupled to ground.

11. An automatic exposure control circuit for a television camera, comprising:
an amplifier having an input coupled to an output of an image pickup tube; a video signal extracting circuit means for dividing a video signal for a field into a plurality of parts in a time division mode for selectively extracting any one of said parts each of which represents a different specified picture region less than the entire field and having an input coupled to an output of said amplifier; a processing circuit having an input coupled to an output of said video signal extracting circuit; a transistor having a base input coupled to an output of said processing circuit and an output electrode coupled through a resistor to said input of said amplifier; and a resistor coupled between a target voltage source and said output electrode of said transistor.

12. The automatic exposure control circuit as claimed in claim 11 wherein said filtering circuit comprises: a resistor having a first terminal coupled to said output of said video signal extracting circuit and a seconsd terminal coupled to said base of said transistor; and a capacitor having a first terminal coupled to said base of said transistor and a second terminal coupled to ground.

* * * * *